Jan. 20, 1948.  C. E. CASPERSON  2,434,684
SWIVEL JOINT FOR ROTARY DRILLING
Filed May 10, 1946

Carl E. Casperson
INVENTOR

ATTORNEY

Patented Jan. 20, 1948

2,434,684

UNITED STATES PATENT OFFICE 2,434,684

SWIVEL JOINT FOR ROTARY DRILLING

Carl E. Casperson, Tulsa, Okla.

Application May 10, 1946, Serial No. 668,869

3 Claims. (Cl. 285—97.3)

The invention relates to swivel joints for rotary drilling, and has for its object to provide a device of this kind, particularly adapted for core drilling, and adapted to take up upward thrust when additional pressure is applied to the device when the drilling operation is through hard formations, where the additional pressure is necessary from above.

A further object is to provide a stationary spring pressed seat carrying member in the upper portion of a stationary suspension member having an annular packing member in the lower end of the seat carrying member, and engaging the upper end of the rotatable member for preventing and reducing leakage.

A further object is to provide thrust bearings in the lower portion of the stationary member, so arranged to take up upward and downward thrust during the drilling operation.

A further object is to mount the thrust bearing around the rotatable member in engagement with a shoulder of the rotatable member and a jam sleeve threaded on the upper end of the rotatable member for forcing the bearings against each other and against the shoulder of the rotatable member. Also to utilize the over-hang apron as a jam nut against the sleeve.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figures 1, 2:
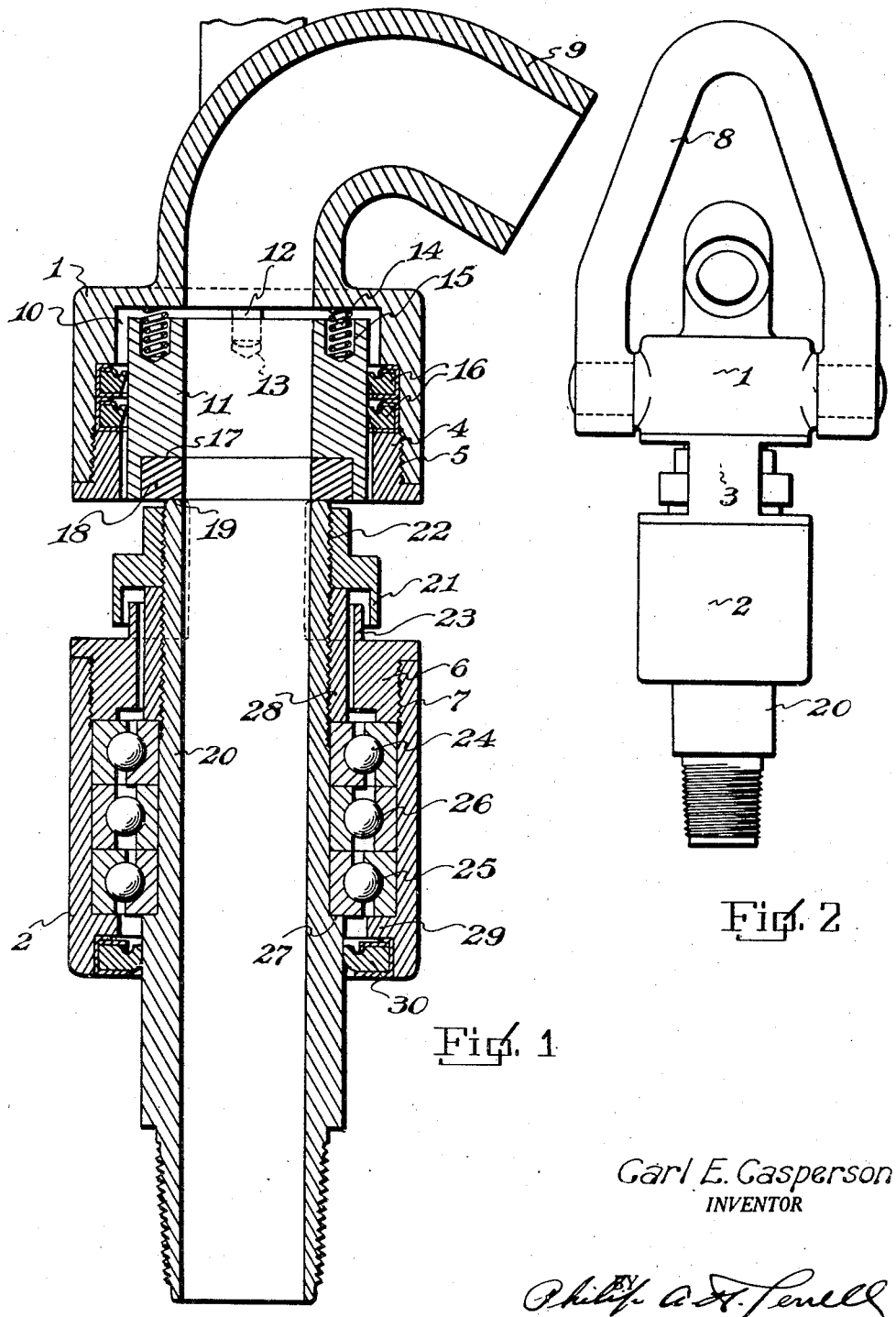
Figure 1 is a vertical transverse sectional view through the swivel joint.
Figure 2 is a side elevation of the swivel joint.

The present invention is an improvement on my prior patent, No. 2,279,969, issued March 19, 1942.

Referring to the drawing, the swivel joint comprises an upper stationary portion 1, and a lower stationary portion 2. Portions 1 and 2 are connected together by an intermediate member 3, the upper end 4 of which is threaded at 5 into the upper portion 1, and the lower portion 6 is threaded at 7 into the member 2, and may be locked therein in any suitable manner. Hingedly connected to opposite sides of the upper portion 1 is a becket or shackle 8, to which hoisting and lowering mechanism may be attached.

Extending upwardly and outwardly from the top of the portion 1 is a conventional goose neck 9, through which mud passes, during the recirculating operation during a drilling operation.

Disposed in the chamber 10 in the upper body portion 1 is an annular floating segment 11 held against rotation by dowels 12, extending into apertures 13 in the upper side of the floating ring 11. It will be noted that the ring 11 has an upward and downward movement in the chamber 10, and is normally forced downwardly by the expansion springs 14 carried in apertures 15 in the upper end of the floating ring, said springs eliminate displacement of the floating member when the hydraulic pressure does not exist. Leakage around the ring 11 is prevented by the sealing rings 16, and it will be noted that the sealing rings are held in clamped position by the member 4.

Disposed in an annular channel 17 in the lower end of the floating ring 11 is an annular valve seat 18, preferably formed from a paraffin impregnated semi-resilient material, and this seat is forced downwardly against the contact seat 19 on the upper end of the rotatable member 20, rotated in the usual manner, during the drilling operation. It will be noted that leakage will be reduced to a minimum between the valve seat 18 and the contact seat 19, however any leakage that takes place at this point or past the sealing ring 16 will be deflected outwardly from the lower part of the device by the apron 21, which apron is threaded at 22 on the upper end of the rotatable member 20, and overlies an annular flange 23 carried by the stationary member 6.

Surrounding the rotatable member 20 is an upper thrust bearing 24 and a lower thrust bearing 25 having a radial bearing 26 interposed between said bearings. The lower thrust bearing 25 engages the annular shoulder 27 of the rotatable member 20 and all of said bearings are clamped together and rigid in relation to the shoulder 27 by a sleeve 28, which sleeve is threaded on the rotatable member 20. It will be noted that the apron 21, which is threaded on the member 20, acts as a jam nut against the clamping sleeve 28 for resisting downward and upward thrust. The outer ring of the lower thrust bearing 25 is engaged by an annular flange 29 within the member 2, and the outer ring of the upper thrust bearing 24 is engaged by the stationary member 6 threaded on the upper end of the stationary member 2, hence it will be seen that upward and downward thrust is taken care of at all times, and that additional weight may be added for drilling hard formations, and that the bearing arrangement will take up the additional upward thrust incident to additional weight.

Fluid is prevented from reaching the device through its various packings, however a pressed oil seal ring 30 is provided in the lower end of the member 2.

From the above it will be seen that a rotary swivel joint is provided for earth drilling devices which will take up upward and downward thrust, reduce leakage to a minimum, deflect fluid from the bearings and one in which the pressure of the fluid will force the annular floating seat into sealed contact with the rotating seat.

The invention having been set forth what is claimed as new and useful is:

1. A swivel joint through which fluid passes, said joint comprising a stationary body portion, a rotatable member extending upwardly into said body portion, a seat carried by the upper end of said rotatable member, a valve carrying annular member in a chamber in the upper end of said stationary member, interengaging slidable connections between said seat carrying member and the upper end of the stationary member within the chamber and spaced expansion springs for normally forcing said annular seat carrying member downwardly towards the seat of the upper end of the rotatable member, and an annular packing ring carried by the lower end of the annular seat carrying member and engaging the rotatable member, supporting bearings for the rotating member within the lower end of the stationary body member, said seat carried by the annular member being disposed in a channel of the annular member and sealing rings within the upper portion of the stationary member and engaging the outer periphery of the seat carrying member.

2. A device as set forth in claim 1 wherein the body member comprises an upper member, a lower member, said members being connected together by an intermediate member threaded into the upper and lower members, thrust bearings in the lower member, a shoulder carried by the rotatable member and on which the bearings rest, a sleeve threaded onto the rotatable member for jamming the bearings together, an apron threaded on the rotatable member and jamming against the sleeve, said apron having a flange overlying a flange carried by the intermediate member above the bearings.

3. A device as set forth in claim 1 wherein the stationary member comprises an upper portion, a lower portion in spaced relation thereto, an intermediate connecting stationary member, the upper and lower ends of the intermediate member being threaded into the upper and lower portions of the stationary member, the lower end of the intermediate member having an upwardly extending annular flange, and an apron threaded on the upper end of the rotatable member and overlying said flange.

CARL E. CASPERSON.

REFERENCES CITED

The following references are of record in the file of this patent:

UNITED STATES PATENTS

| Number | Name | Date |
|---|---|---|
| 1,129,815 | Shaffer et al. | Feb. 23, 1915 |
| 1,870,036 | Bruce | Aug. 2, 1932 |
| 2,269,431 | Allen et al. | Jan. 13, 1942 |